(12) United States Patent
Lee et al.

(10) Patent No.: US 7,619,777 B2
(45) Date of Patent: Nov. 17, 2009

(54) METHOD OF GENERATING HALFTONE SCREEN AND SYSTEM THEREOF

(75) Inventors: Hae-kee Lee, Suwon-si (KR); Goo-soo Gahang, Yongin-si (KR); Byung-min Kang, Incheon (KR); Choon-woo Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 560 days.

(21) Appl. No.: 11/390,252

(22) Filed: Mar. 28, 2006

(65) Prior Publication Data

US 2007/0019240 A1    Jan. 25, 2007

(30) Foreign Application Priority Data

Jul. 25, 2005    (KR) .................... 10-2005-0067567

(51) Int. Cl.
    *H04N 1/405*    (2006.01)
(52) U.S. Cl. ...................... 358/3.06; 358/3.2
(58) Field of Classification Search ............ 358/1.9, 358/3.01, 3.06, 3.07, 3.09, 3.13, 3.16, 3.17, 358/3.18, 3.19, 3.2, 534, 535, 536
See application file for complete search history.

(56) References Cited

U.S. PATENT DOCUMENTS

| 5,859,955 | A | 1/1999 | Wang |
| 6,233,060 | B1 * | 5/2001 | Shu et al. .................... 358/1.9 |
| 6,710,778 | B2 * | 3/2004 | Cooper ...................... 345/596 |
| 6,791,718 | B1 | 9/2004 | Allebach et al. |
| 2003/0107768 | A1 | 6/2003 | Crounse |
| 2006/0103883 | A1 * | 5/2006 | Damera-Venkata ......... 358/3.2 |

FOREIGN PATENT DOCUMENTS

| JP | 2000-295473 | 10/2000 |
| KR | 1020010048592 | 6/2001 |

* cited by examiner

*Primary Examiner*—Thomas D Lee
(74) *Attorney, Agent, or Firm*—Stanzione & Kim, LLP

(57) ABSTRACT

A halftone screen generating method includes growing dot centers into uniform binary patterns in an input image, calculating a main distance of each dot center, forming a screen filter by using the main distance, and generating the halftone screen by using the screen filter to form a binary image. The halftone screen generating method controls cluster dots to have a predetermined main distance, and improve a printing quality by growing dot centers uniformly.

19 Claims, 10 Drawing Sheets

MAIN DISTANCE

FIG. 4B

DISTANCE FUNCTION

METHOD OF GENERATING HALFTONE SCREEN AND SYSTEM THEREOF

CROSS-REFERENCE TO RELATED APPLICATIONS

This application claims the benefit under 35 U.S.C. § 119(a) of Korean Patent Application No. 2005-67567, filed on Jul. 25, 2005 in the Korean Intellectual Property Office, the entire contents of which are incorporated herein by reference.

BACKGROUND OF THE INVENTION

1. Field of the Invention

The present general inventive concept relates to a method of generating a halftone screen in an image forming device and a system thereof, and more particularly, to a method of generating a halftone screen to improve a printing quality in an image forming device, and a system thereof.

2. Description of the Related Art

Generally, printing devices have two brightness levels according to whether dots are printed, which is different from multi-level image devices. A method of printing a multi-level input image using a binary printing device is called halftoning.

In other words, an image having 256 brightness levels from 0 to 255 is generally called a continuous gray-level image, and a method of expressing or generating the continuous gray-level image in a binary output device (e.g., a printing device) using only 0 (i.e., black) and 255 (i.e., white) is called halftoning. An image generated based on a halftoning method is referred to as a binary image.

The halftoning method includes a screening method, an error spreading (diffusion) method to halftone through optimization. The screening method is a method of performing binarization by comparing a gray-level value of a pixel to be binarized with a predetermined threshold, which is part of a threshold array. The error spreading method is a method of taking an error occurring during binarization into consideration by spreading the error on surrounding pixels to be binarized based on a predetermined kernel value at a predetermined rate.

Although the screening method is a faster method than the error spreading method, the screening method has an inferior image quality at a low definition level. Since the error spreading method is not suitable for a laser printing device with irregular dot positions and sizes, the screening method is widely adopted by laser printing devices.

Screens are divided into an amplitude modulated (AM) screen and a frequency modulated (FM) screen according to how dots are arrayed. Since the AM screen is output with clusters of dots, the AM screen can be output more stably compared to the FM screen.

For this reason, the laser printing devices use the AM screen. The AM screens are classified into one of an AM ordered screen and an AM stochastic screen according to how the cluster dots are arrayed.

An output image binarized by using an AM ordered screen has a periodic cluster dot array or a periodic halftone dot array. However, an output image binarized by using an AM stochastic screen does not have the periodic cluster dot array.

The image binarized by using the AM ordered screen may have an unpleasant pattern due to the periodic cluster dot pattern. Particularly, when an input image has a periodic pattern, the output image has a subject moiré pattern having a periodic band in a predetermined direction.

In order to solve the above-described problems, a method of generating a screen which does not to have the periodic cluster dot array has been suggested. The conventional screen-generating method forms dot clusters from halftone dots using a spatial filter (i.e., an evaluation function).

Figure 1:
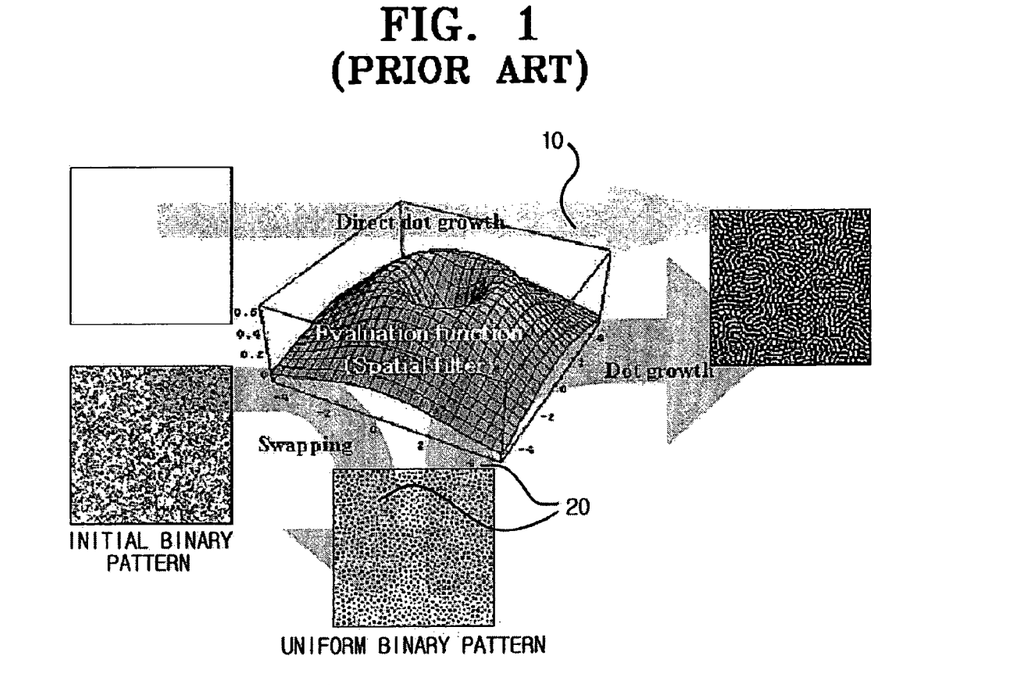
FIG. 1 illustrates a conventional amplitude modulated (AM) stochastic screen generating method.

FIG. 1 illustrates a conventional AM stochastic screen generating method. Generally, a screen can be generated by two methods which are illustrated in FIG. 1. One of the two methods is a direct dot growing method 10 using a spatial filter on an initial dot distribution and the other one of the two methods is a swapping growing method 20 using an initial binary pattern.

In the direct dot growing method 10, one arbitrary dot is selected as an initial dot and then a continuous dot order is determined based on the spatial filter. A multi-level input is converted into an output tone level based on the number of dots, so that a light gray-level range has a small number of dots while a shadow range has a large number of dots. Here, the number of dots increases as the output tone level varies from a light gray-level to a dark gray-level. The increase in the number of dots is called growing, and a gradual increase of the number of black dots is called order. Here, the order is determined according to a position having a minimum value after a mask operation using the spatial filter.

Figure 2:
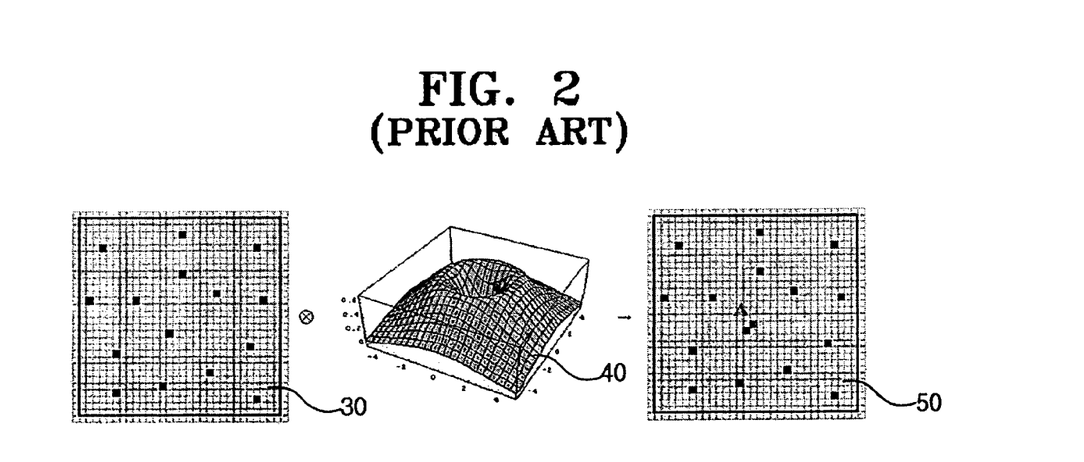
FIG. 2 illustrates a conventional dot order determining method.

FIG. 2 illustrates a conventional dot order determining method. A predetermined dot distribution 30 has dots (pixels) grown according to a predetermined order of 0 to 14. A next dot order is the fifteenth order, and a spatial filter 40 is used to determine a position 'A' having a minimum value calculated by performing convolution on the predetermined dot distribution 30 by and using the spatial filter 40. The positions of the dots 1 to 15 are determined based on minimum values.

The following Equation 1 illustrates the above-described order determining method.

$$\cos t(i,j) = \text{filter}(i,j) ** \text{dot}(i,j) \quad \text{Equation 1}$$

where filter (j,j) denotes the spatial filter, dot(i,j) denotes a dot distribution, and ** denotes a circular convolution.

Dots with a determined order have a '1 (on)' value, whereas dots without a determined order have a '0 (off)' value. The mask operation is performed until determining positions of all dots that have a '1' value. In short, when horizontal and vertical sizes of a screen are M and N, respectively, the dot order may have a value from '0' to 'M*N−1'. The following Equation 2 represents the above-described spatial filter.

$$\text{filter}(i,j) = e^{-\frac{i^2+j^2}{2\sigma_1^2}} - e^{-\frac{i^2+j^2}{2\sigma_2^2}} \quad \text{Equation 2}$$

The Equation 2 uses a difference between two Gaussian functions, i and j are coordinates of a dot and, herein, a standard deviation '$\sigma_1$' should be always larger than a standard deviation '$\sigma_2$.' However, in the direct dot growing method, the dot distribution is not uniform in a highlight range. For this reason, the mask operation is carried out after the swapping growing method 20 using the initial binary pattern of FIG. 1 in the AM stochastic screen generating method.

In this case, after a predetermined number of dots that represent a particular gray-level are initially distributed arbitrarily, the initial dot distribution is rearrayed by using the spatial filter. A rearray operation is as follows.

First, a value of a cost function for an initial dot distribution is calculated and then the initial dot distribution is rearrayed. Then, a value of the cost function for the rearrayed dot distribution is calculated. The dot distribution with a smaller cost value between the initial distribution and the rearrayed distribution is stored. The above-described operation is repeated until the value of the cost function converges to a predetermined value. A final dot distribution is defined as a uniform binary pattern. The operation of rearraying the dots is called a swapping operation, and the numbers of black and white dots before and after the swapping operation should be the same.

When a uniform binary pattern is completed at a predetermined gray-level, the mask operation is performed by using the same spatial filter. For a gray-level lighter than the predetermined gray-level, dots are removed one by one and, for a gray-level darker than the predetermined gray-level, dots are added one by one. In an image binarized by using the above-described AM screen generating method, an undesirable circular pattern disappears compared to when using the AM ordered screen generating method.

However, although in the above-described conventional method a main distance of a cluster of dots is adjusted by tuning the values '$\sigma_1$' and '$\sigma_2$', the conventional halftoning method does not provide any basis for a proper controlling method of the main distance. In short, the conventional method has a problem in that it is hard to generate a screen such that the cluster of dots have a particular main distance.

SUMMARY OF THE INVENTION

The present general inventive concept provides a method of generating a halftone screen to improve a printing quality in an image forming device, and a system thereof.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of generating a halftone screen in an image forming device, which includes growing dot centers into uniform binary patterns in an input image, calculating a main distance of each dot center, forming a screen filter using the main distance, and generating the halftone screen using the screen filter to form a binary image.

The growing of the dot centers operation may include using a distance function to evaluate an extent of a uniform distribution of the dot centers such that the main distance is calculated.

The forming of the screen filter may include forming a frequency filter based on the main distance, and forming a spatial filter by performing inversion on the frequency filter from a frequency domain into a spatial domain.

Also, the frequency filter may be formed to have characteristics opposite to characteristics of the frequency domain of the binary image of the image.

Also, the spatial filter may be one of spatial filters that can be generated by inverting a graph obtained by shifting a graph of the frequency filter formed based on the main distance by a predetermined offset value.

Also, the dot centers may be generated arbitrarily by white noise.

The foregoing and/or other aspects of the present general inventive concept may also be achieved by providing a system to generate a halftone screen in an image forming device, which includes a dot center determining unit to grow arbitrarily generated dot centers into uniform binary patterns, a filter forming unit to calculate a main distance of a dot center and to form a screen filter based on the main distance, and a screen generating unit to generate a halftone screen based on the screen filter.

The dot center determining unit may evaluate an extent of a uniform distribution of dot centers based on a distance function.

The filter forming unit may form a frequency filter based on the main distance and may form the screen filter by inverting the frequency filter.

The filter forming unit may form the frequency filter to have characteristics opposite to characteristics in the frequency domain of the binary image of the image.

The spatial filter may be one of spatial filters that are generated by inverting a graph obtained by shifting a graph of the frequency filter by a predetermined offset.

The dot centers may be generated arbitrarily by white noise.

The foregoing and/or other aspects of the present general inventive concept may also be achieved by providing an image forming device having a halftone screen generating system, which includes a dot center determining unit to grow arbitrarily generated dot centers into uniform binary patterns, a filter forming unit to calculate a main distance of a dot center and forming a screen filter based on the main distance, and a screen generating unit to generate a halftone screen based on the screen filter.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
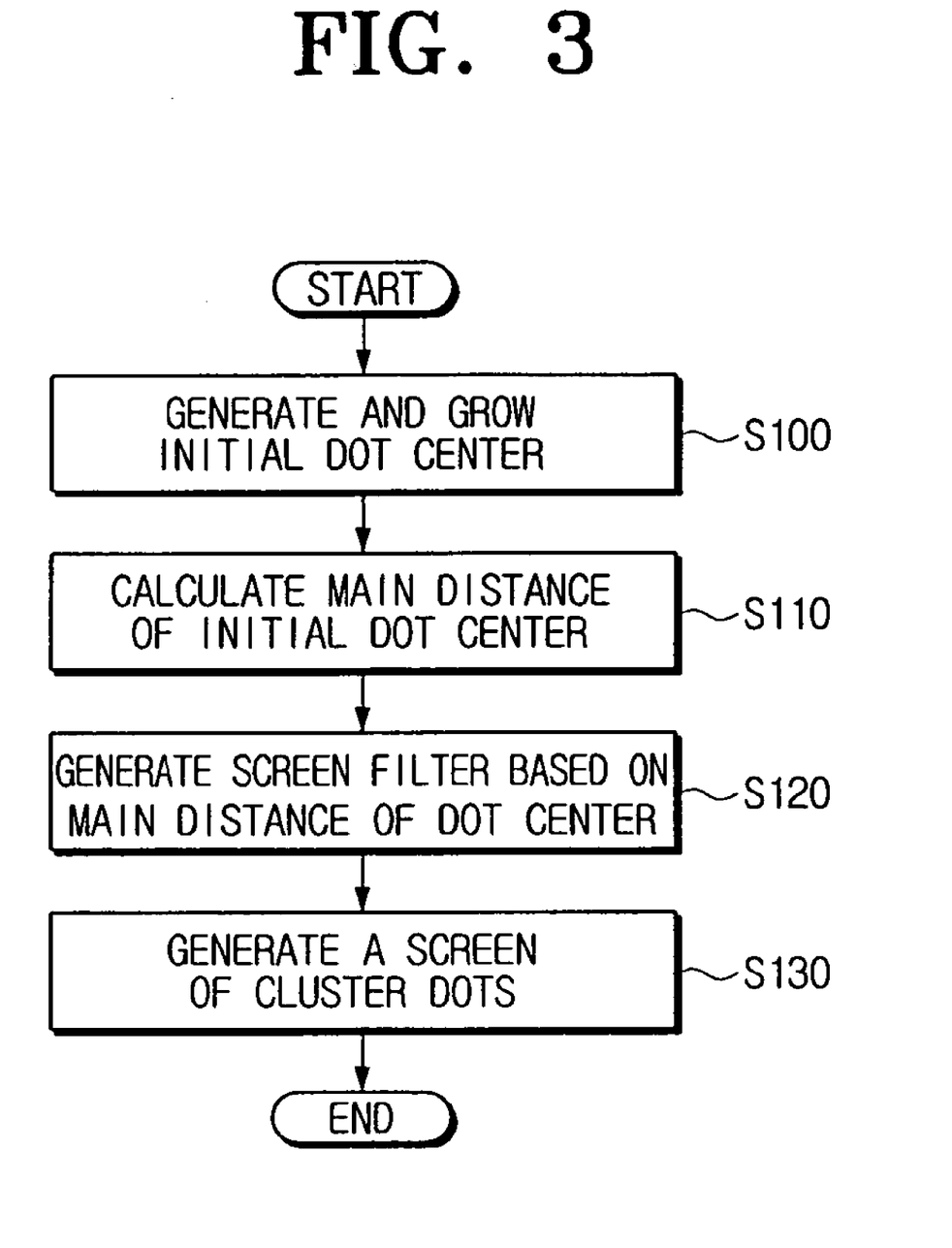
FIG. 3 is a flowchart of a halftone screen generating method according to an embodiment of the present general inventive concept.

FIG. 3 is a flowchart describing a halftone screen generating method according to an embodiment of the present general inventive concept. Similar to an amplitude modulated (AM) ordered screen generating method, in the halftone screen generating method according to the embodiment illustrated in FIG. 3, a halftone screen is generated by determining a distribution of initial dot centers and then growing clusters of dots around the dot centers distributed according to the determined distribution. The initial dot centers may be arbitrarily generated dot centers.

The halftone screen generating method according to the present embodiment will be described hereinafter with reference to FIG. 3. In operation S100, a dot center determining unit grows the dot centers in uniform binary patterns by increasing the number of dots between the dot centers. The initial dot centers may be moved to or replaced by the dot centers in different positions such that the dot centers are disposed in the uniform binary patterns. The distribution of the initial dot centers affects distribution characteristics of the cluster dots grown around the dot centers. Thus, the halftone screen generating method according to the present embodiment uniformly distributes the initial dot centers according to channels between adjacent initial dot centers such that the cluster dots have uniform distribution characteristics.

When the channels overlap, the initial dot centers are uniformly distributed so that clusters of adjacent dot centers do not overlap between the dot centers.

For this, a cost function to evaluate an extent of the uniform distribution of the dot centers is defined. The cost function used in the present embodiment includes a distance function to compute effects of one dot center on adjacent dot centers.

Figure 4A:
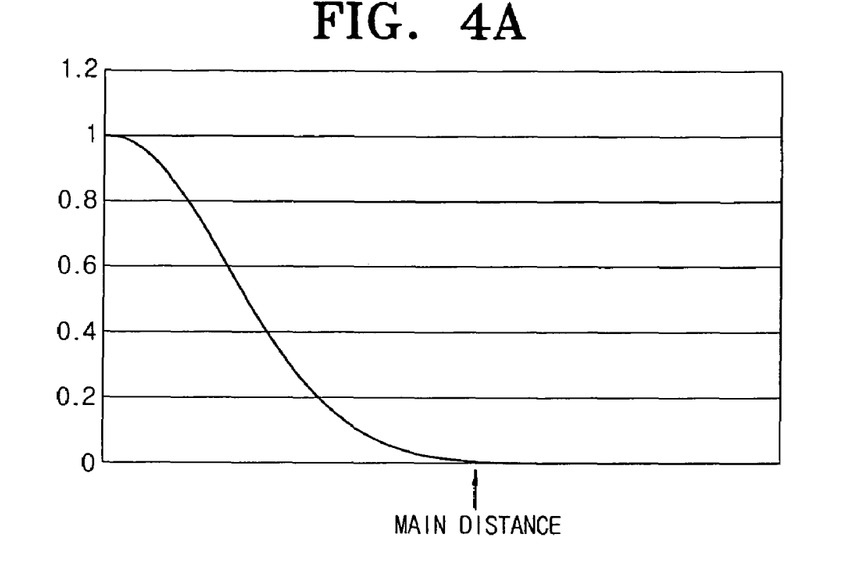
FIG. 4A is a graph illustrating a distance function according to an embodiment of the present general inventive concept.

FIG. 4A is a graph illustrating a distance function according to an embodiment of the present general inventive concept. Referring to FIG. 4A, the distance function has a maximum value at a dot center, and values of the distance function decrease as a distance from the dot center increases. The maximum value of the distance function at a dot center may be 1.

Thus, the distance function has a minimum value at more than a principal distance, i.e., a desirable distance that should be maintained between dot centers. The minimum value of the distance function at a dot center may be 0.

A cost for one dot center can be calculated by using the distance function as a weight based on Equation 3:

$$\text{cost} = \sum_{i=-n}^{n} \sum_{j=-n}^{n} D(m+i, n+j) \otimes DF(i, j) \qquad \text{Equation 3}$$

where $D(m+i, n+j)$ denotes distribution of a dot center and $DF(i,j)$ denotes the distance function. The values i and j are in a range of $-n$ to n, and the range is large enough to cover values of the distance function. An operator $\otimes$ is a circular multiplication for taking 'tilting' into cost calculation.

Figure 4B:
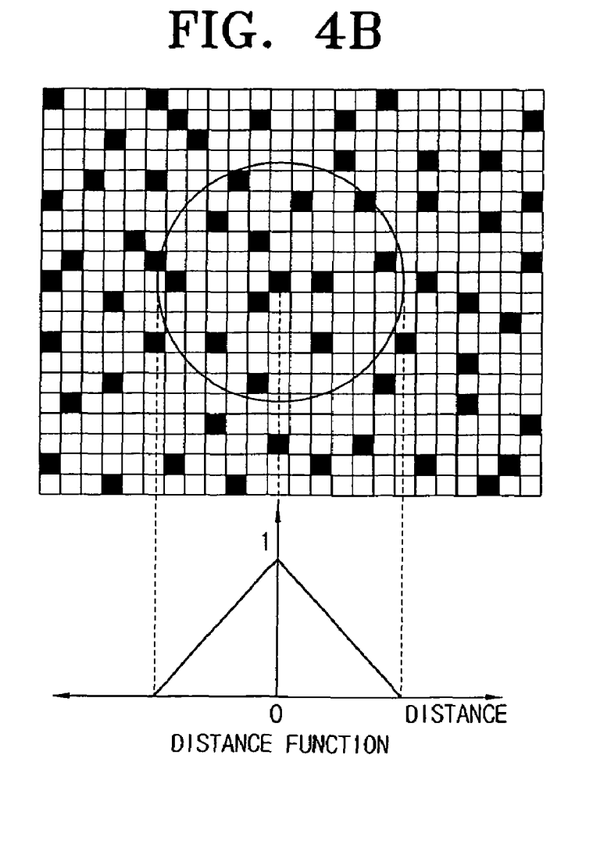
FIG. 4B visually illustrates a cost function according to an embodiment of the present general inventive concept.

FIG. 4B visually illustrates the cost function using the Equation 3 according to an embodiment of the present general inventive concept. A total cost is obtained by applying the Equation 3 to all the dot centers and adding the calculated cost values.

Figure 5A:
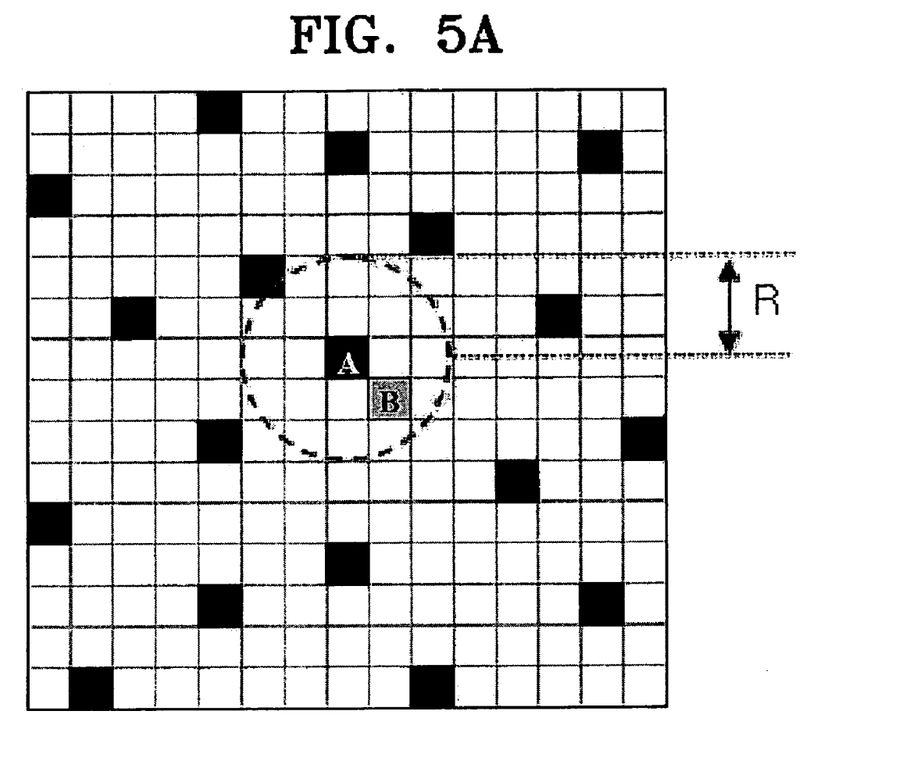
FIG. 5A is a diagram illustrating a method of enhancing a uniform distribution of dot centers based on the cost function of FIG. 4B.

FIG. 5A is a diagram illustrating a method of enhancing a uniform distribution of dot centers based on the cost function defined in the Equation 3. Referring to FIGS. 3 through 5A, the dot center determining unit increases the extent of uniform distribution of the dot center by performing a smoothing operation. A candid range is set to have a radius R, an application range of the smoothing operation is determined from the candid range based on one dot center, a position A positioned at the center of the application range is swapped with a position B where the cost is smallest when the swapping operation is performed. That is, the center of the application range of the smoothing operation is changed from the position A to the position B.

Figure 5B:
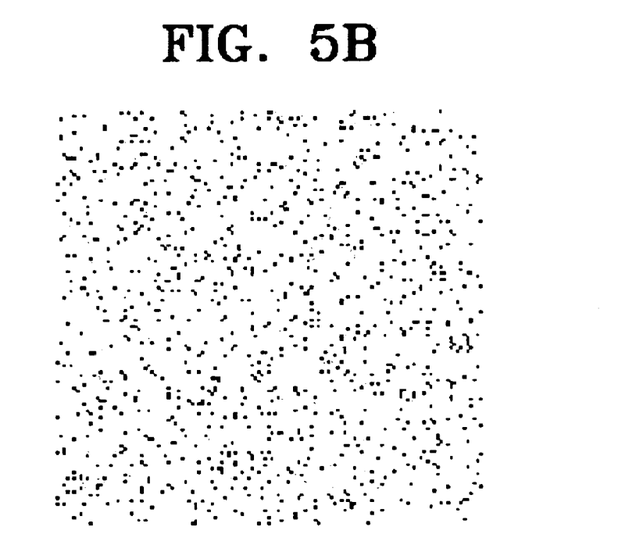
FIG. 5B is a diagram illustrating arbitrarily distributed dot centers.
Figure 5C:
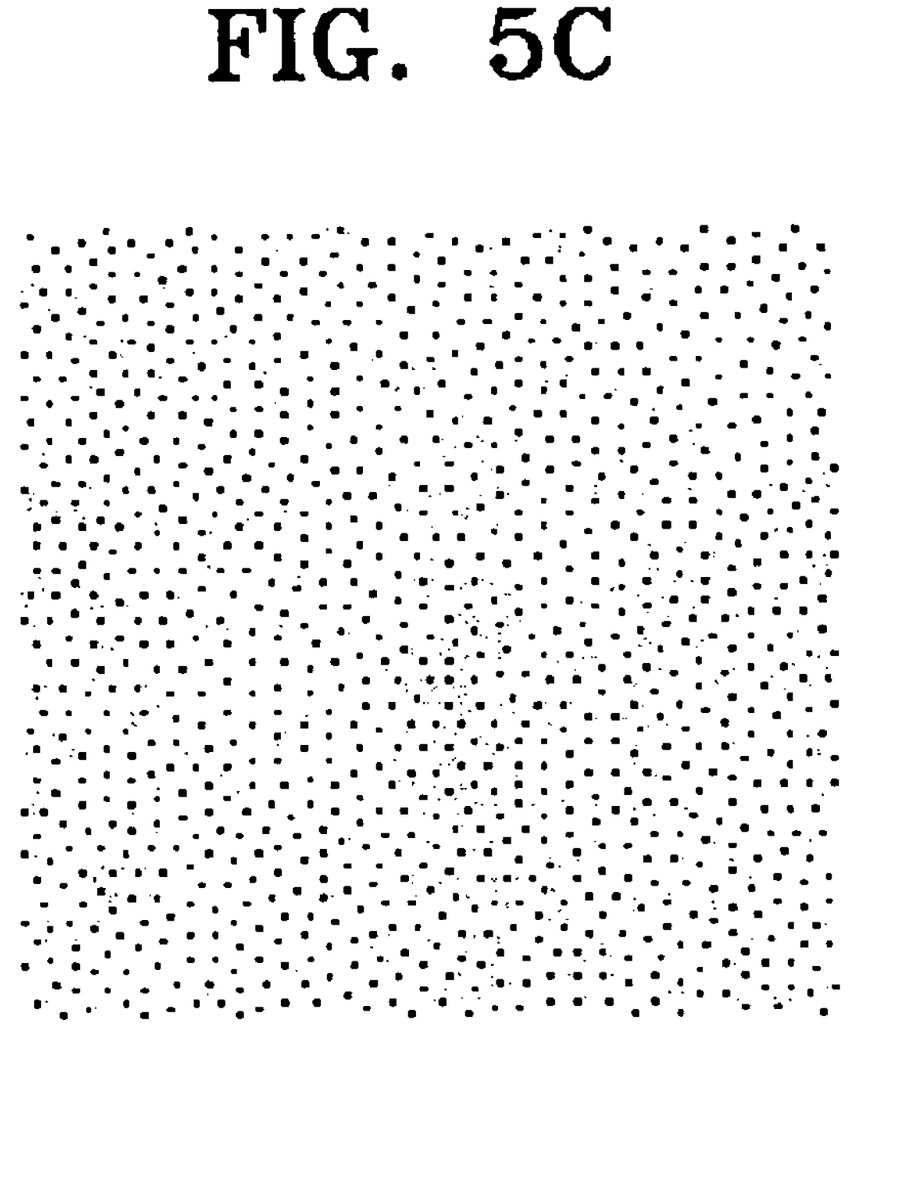
FIG. 5C is a diagram illustrating the dot centers distributed by performing five times a smoothing operation on the dot center distribution of FIG. 5B.

When the smoothing operation is carried out about five to seven times with respect to all the dot centers, uniformly distributed dot centers can be obtained. FIG. 5B is a diagram illustrating dot centers arbitrarily distributed, and FIG. 5C is a diagram illustrating dot centers distributed by performing the smoothing operation on arbitrarily distributed dot centers of FIG. 5B five times.

Subsequently, in operation S110 (see FIG. 3), a filter forming unit calculates a main distance of the dot center.

Figure 6A:
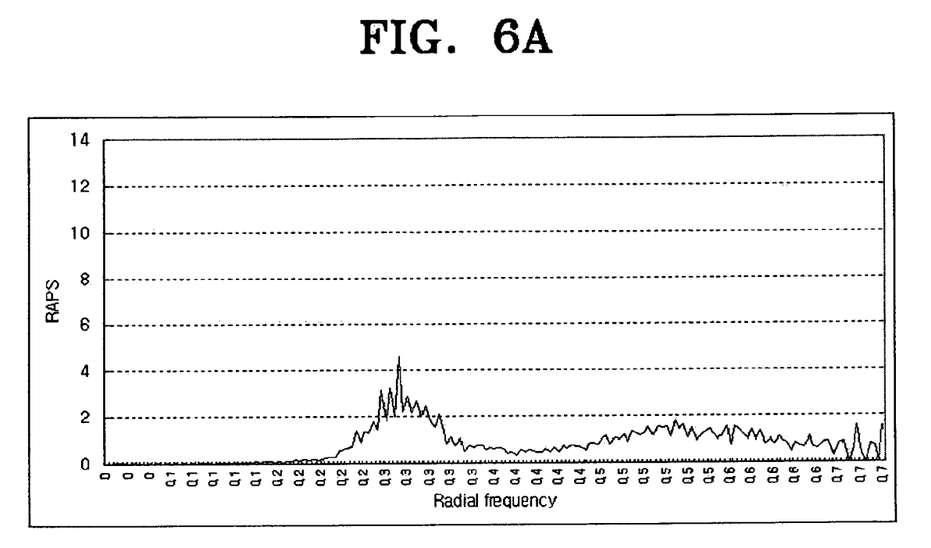
FIG. 6A is a graph illustrating a radially averaged power spectrum used as a measure of checking a main distance of a dot center.

FIG. 6A is a graph illustrating a radially averaged power spectrum that is used as a measure for checking a main distance of a dot center. In FIG. 6A, a horizontal axis indicates a radial frequency, and a vertical axis indicated a number of dot centers having the radial frequency.

Figure 6B:
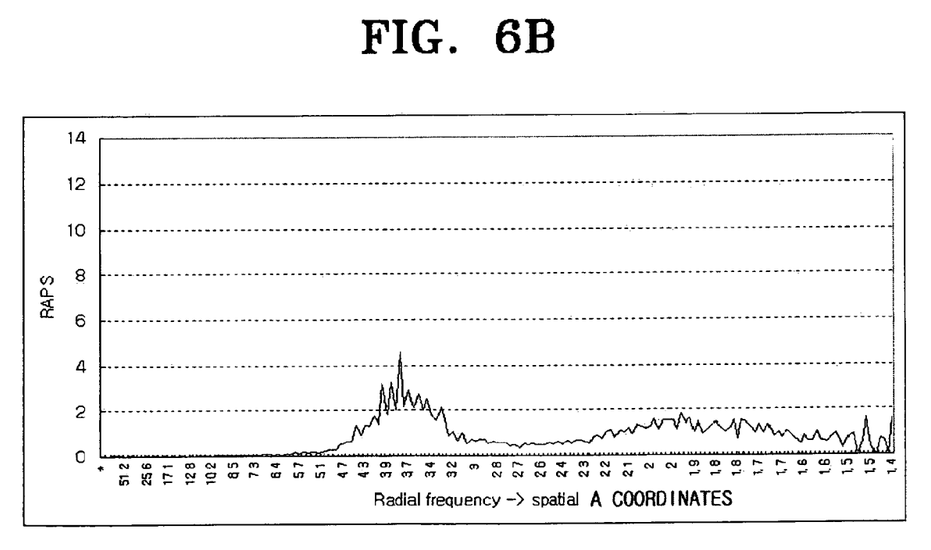
FIG. 6B is a graph illustrating the graph of FIG. 6A in spatial coordinates.

FIG. 6B is a graph representing the graph of FIG. 6A in spatial coordinates. In FIG. 6B, the horizontal axis becomes the main distance of the dot center. The main distance 3.9 of FIG. 6B can be used as an input parameter to form a spatial filter.

In other words, in operation S120, a screen filter is formed based on the main distance calculated for the dot centers.

In a mask operation, frequency characteristics of a filter and dot distribution are checked in a frequency modulated (FM) stochastic screen. The spatial filter used to generate the screen performs convolution, and the convolution in a spatial domain can be expressed in a frequency domain as Equation 4:

$$[\text{filter}(i,j)**\text{dot}(i,j)] = \text{Filter}(u,v) \times \text{Dot}(u,v) \qquad \text{Equation 4}$$

where Filter(u,v) is obtained by performing frequency conversion on the spatial filter used to generate a screen, and Dot(u,v) is obtained by performing frequency conversion on the dot distribution.

When Filter(u,v) has a characteristic of a low pass filter in the frequency domain, Dot(u,v) has a characteristic of a high pass filter due to a position (imin, jmin) having the minimum cost in the mask operation.

When 'Filter(u,v)×Dot(u,v)' maintains the minimum value, 'Filter(u,v)' and 'Dot(u,v)' have opposite frequency characteristics to each other.

Figure 7:
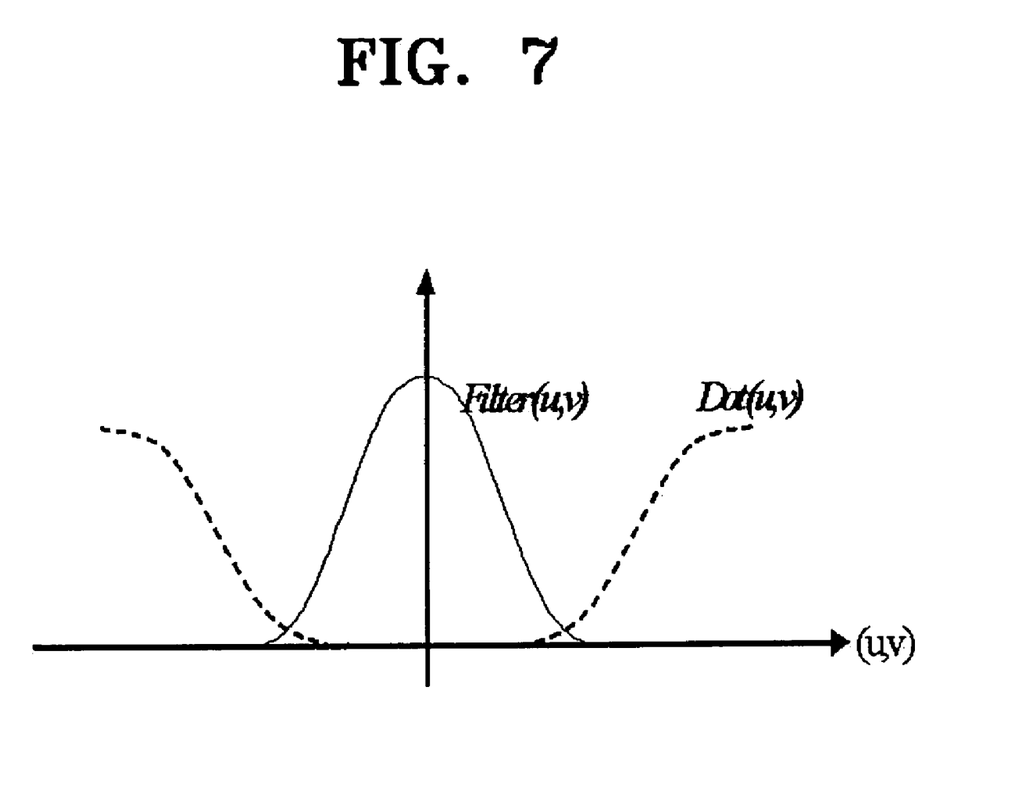
FIG. 7 is a graph illustrating frequency characteristics of 'Filter(u,v)' and 'Dot(u,v)' in a mask operation according to an embodiment of the present general inventive concept.

FIG. 7 is a graph illustrating frequency characteristics of 'Filter(u,v)' and 'Dot(u,v)' in the mask operation according to an embodiment of the present general inventive concept. In other words, the 'Filter(u,v)' determines 'Dot(u,v)' to have predetermined frequency characteristics.

When 'Dot(u,v)' has the characteristics of a band pass filter in the AM stochastic screen generating method of the present embodiment, the 'Filter(u,v)' used to generate a screen in the present embodiment has the characteristics of a band reject filter. The following Equation 5 is used for the 'Filter(u,v)' that has the characteristics of the band reject filter.

$$\text{Filter}(r) = C\left(1 - \frac{r^2}{2\sigma^2}\right)\exp\left(-\frac{r^2}{2\sigma^2}\right) + \text{offset},$$

$$r = \sqrt{u^2 + v^2}$$

Equation 5

Figure 8A:
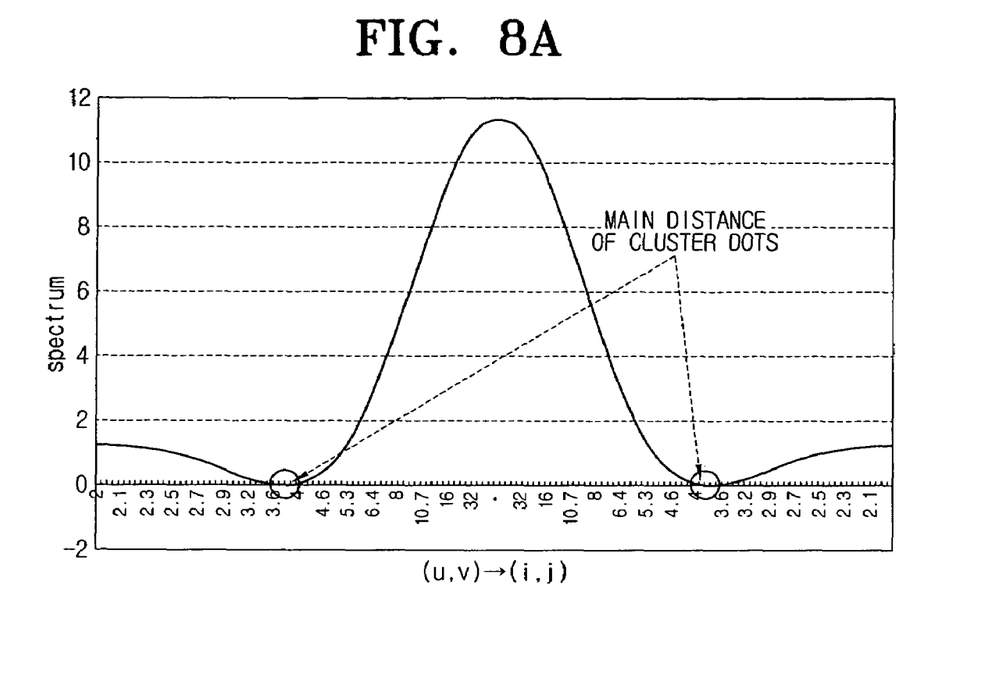
FIG. 8A is a graph illustrating a characteristic of a band pass filter of an AM stochastic screen generating method.

FIG. 8A is a graph illustrating Equation 5. The Equation 5 is obtained by differentiating a Gaussian function twice. Referring to FIG. 8A, horizontal coordinates are converted into spatial coordinates (i,j) from frequency coordinates (u,v) to easily check the main distance of cluster dots.

A value σ is determined such that a minimum value of the Filter(r) is used as the main distance of cluster dots. The value σ is determined as follows.

1) A desired main distance of cluster dots is determined as $\lambda_0$, and $\lambda_0$ is converted into a frequency coordinate value $r_0$.

2)

$$\frac{d(\text{Filter}(r))}{dr} = 0$$

is calculated to induce a relational equation between σ and r.

3) A value $\sigma_0$ is calculated by substituting $r_0$ into the above-generated equation.

4) An offset value is obtained by substituting $r_0$ and $\sigma_0$ into the following Equation 6.

5) Filter(r) is obtained by substituting $\sigma_0$ and the offset value into the Equation 5.

$$\text{offset} = -C\left(1 - \frac{r_0^2}{2\sigma_0^2}\right)\exp\left(-\frac{r_0^2}{2\sigma_0^2}\right),$$

$$\sigma = \frac{r}{2}$$

Equation 6 where $r_0$ denotes a frequency coordinate value corresponding to the main distance of cluster dots and $\sigma_0$ is a value maintaining $r_0$ in the minimum value.

The graph of FIG. 8A is obtained by calculating $\sigma_0$ after converting $\lambda_0$=3.9 into a frequency value and substituting the obtained $\sigma_0$ into the Equation 5. The graph of FIG. 8A corresponds to a frequency filter Filter(u,v). Here, the frequency filter Filter(u,v) is formed to have opposite characteristics to those of a frequency domain of a generated binary image.

Figure 8B:
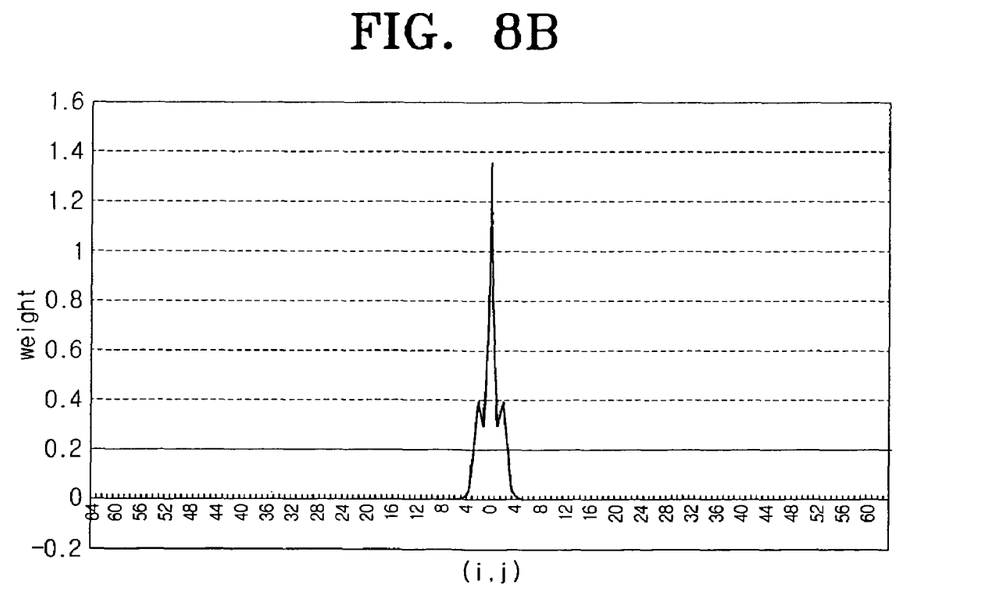
FIG. 8B is a graph obtained by a performing frequency inversion on the graph of FIG. 8A.

FIG. 8B is a graph obtained by performing frequency inversion (i.e., transformation from the frequency domain to space domain) on the graph of FIG. 8A. The graph of FIG. 8B corresponds to a spatial filter Filter(i,j). All spatial filters obtained by inverting the graphs obtained by vertically moving (shifting) the graph of FIG. 8A by a predetermined offset value can be used as the spatial filter in the present embodiment. The vertical movement (shift) by the predetermined offset value can be controlled by adjusting a value of the offset in the Equation 5.

In the present embodiment of the present general inventive concept, the frequency inversion is performed to transform (invert) a filter Filter (u,v) from the frequency domain into Filter(i,j) in the spatial domain. A frequency component has a real number part and an imaginary number part. In order for the Filter(i,j) to be radially symmetric, that is, to form an even function, all the imaginary number part should be '0.' Therefore, only the real number part is considered in the Filter(u,v) used in the present embodiment.

Figure 9:
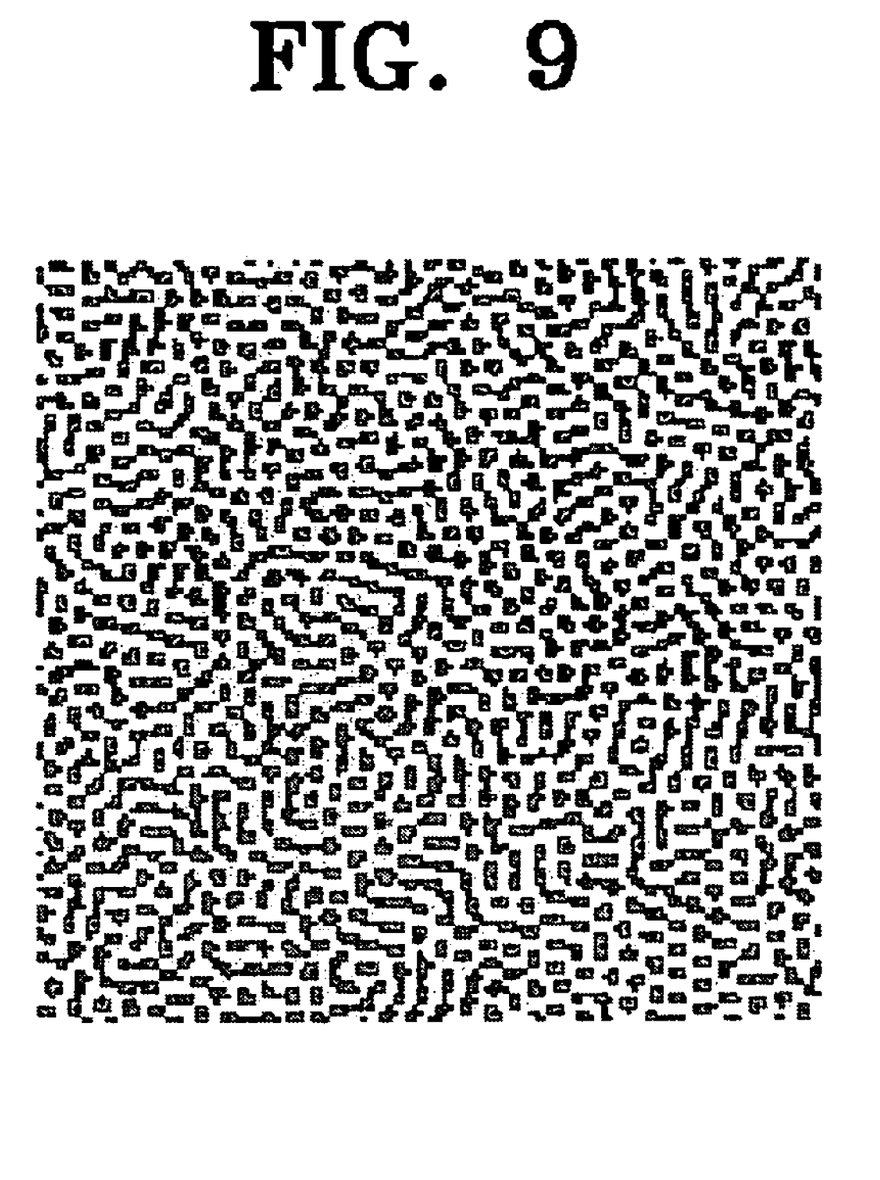
FIG. 9 illustrates a distribution of dot centers and cluster dots grown up to a particular gray-level when the main distance of the dot centers and the main distance of the cluster dots are the same according to an embodiment of the present general inventive concept.

FIG. 9 illustrates a distribution of dot centers and cluster dots grown up to a particular gray-level when the main distance of the dot center and the main distance of the cluster dots are the same according to an embodiment of the present general inventive concept.

As illustrated in FIG. 9, the cluster dots have been grown into neighboring area of each dot center. The distribution of the initial dot centers determines the performance of a screen (binary image). In operation S130 (see FIG. 3), a cluster dot screen is generated by using the screen filter formed in the operation S120.

Figure 10:
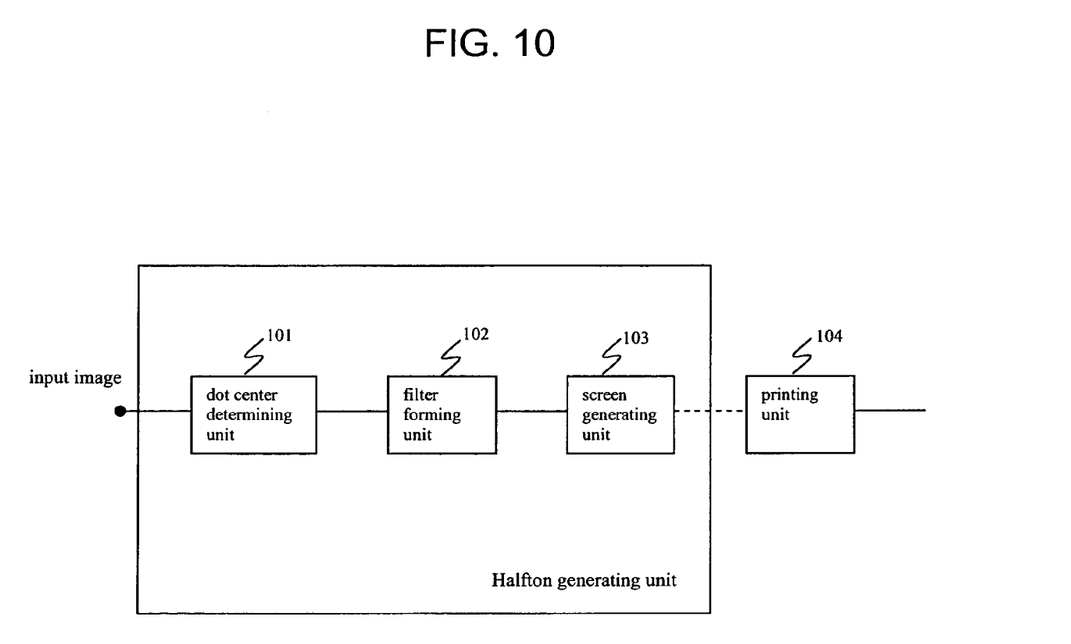
FIG. 10 is a view illustrating an image forming apparatus having a halftoning method according to an embodiment of the present general inventive concept.

FIG. 10 is a view illustrating an image forming apparatus to generate and print an image using a halftoning method according to an embodiment of the present inventive concept. Referring to FIGS. 3 through 10, the image forming apparatus comprises a dot center determining 101 to generate and grow initial dot center and to calculate a main distance of initial dot center of an input image, a filter forming unit 102 to generate a screen filter based on a main distance of dot center, and a screen generating unit 103 to generate a screen of cluster of dots, and a printing unit 104 to print the image formed according to the screen of cluster dots.

As described above, the present general inventive concept provides a filter by analyzing a distribution of cluster dots through frequency analysis, whereas a conventional technology uses a method of controlling the values $\sigma_1$ and $\sigma_2$ to determine a distribution of cluster dots to have a main distance.

Furthermore, since the filter is formed in the frequency domain, the screen can have particular frequency characteristics, while the conventional methods form a filter in a spatial domain to generate a screen.

As described above, according to various embodiments of the present general inventive concept, halftone screen generating methods can easily control cluster dots to have a predetermined main distance when generating a screen (binary image), and can improve a printing quality by growing the dot centers uniformly.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of generating a halftone screen in an image forming device, comprising:
    growing dot centers into uniform binary patterns in an input image;
    calculating a main distance of each dot center from adjacent dot centers;
    forming a screen filter using the main distance; and
    generating the halftone screen using the screen filter to form a binary image,
    wherein the forming of the screen filter comprises:
        forming a frequency filter based on the main distance; and
        forming the screen filter by performing inversion of the frequency filter from a frequency domain to a spatial domain.

2. The method as recited in claim 1, wherein the growing of the dot centers operation comprises using a distance function to evaluate an extent of a uniform distribution of dot centers such that the main distance is calculated.

3. The method as recited in claim 1, wherein the frequency filter is formed to have characteristics opposite to characteristics of the frequency domain of the binary image of the image.

4. The method as recited in claim 1, wherein the screen filter is one of spatial filters that are generated by inverting a graph obtained by shifting a graph of a frequency filter formed based on the main distance by a predetermined offset value.

5. The method as recited in claim 1, wherein the dot centers are generated arbitrarily using white noise.

6. The method as recited in claim 1, wherein the growing of the dot centers comprises distributing initial dot centers in the uniform binary patterns to form uniformly distributed dot centers as the dot centers.

7. The method as recited in claim 1, wherein the growing of the dot centers comprises increasing the number of dots between the adjacent dot centers.

8. The method as recited in claim 1, wherein the growing of the dot centers comprise swapping first positions of the dot centers with second positions according to distribution characteristics.

9. The method as recited in claim 1, wherein the growing of the dots comprises moving positions of the dot centers.

10. The method as recited in claim 1, wherein the forming of the screen filter comprises inverting the input image having the main distance between the dot centers from a frequency domain to a spatial domain to form the screen filter.

11. The method as recited in claim 1, wherein the generating of the halftone screen comprises generating a multi-level brightness image by disposing first level brightness dots in clusters of dots around each dot center, a number of the first level brightness dots being correlated with a brightness level corresponding to the dot center and positions of the first level brightness dots being determined using an evaluation function and a distribution of the dot centers.

12. The method as recited in claim 11, wherein the growing of the dot centers comprises repeated smoothing of the initial distribution of the dot centers, by replacing each dot center in a middle of a substantially circular area defined to exclude any neighboring dot center.

13. The method of claim 1, wherein the forming of the screen filter comprises:

defining a filter function in a frequency domain of coordinates u and v as $$\text{Filter}(r) = C\left(1 - \frac{r^2}{2\sigma^2}\right)\exp\left(-\frac{r^2}{2\sigma^2}\right) + \text{offset},$$

$$r = \sqrt{u^2 + v^2},$$

wherein C, σ, and offset are parameters, and σ is determined by the main distance; and converting the filter function from the frequency domain to space domain and determining the screen filter as the real part of the converted filter function.

14. A system to generate a halftone screen in an image forming device, the system comprising:

a dot center determining unit to grow arbitrarily generated dot centers into uniform binary patterns;

a filter forming unit to calculate a main distance of the dot centers from adjacent dot centers and to form a screen filter based on the main distance; and a screen generating unit to generate a halftone screen based on the screen filter, wherein the filter forming unit forms a frequency filter based on the main distance in a frequency domain and forms the screen filter in a spatial domain by inverting the frequency filter.

15. The system as recited in claim 14, wherein the dot center determining unit evaluates an extent of a uniform distribution of the dot centers based on a distance function.

16. The system as recited in claim 14, wherein the filter forming unit forms the frequency filter to have characteristics opposite to characteristics in a frequency domain of a binary image.

17. The system as recited in claim 14, wherein the screen filter is one of spatial filters that are generated by inverting a graph obtained by shifting a graph of the frequency filter by a predetermined offset.

18. The system as recited in claim 14, wherein the dot centers are generated arbitrarily using white noise.

19. An image forming device having a halftone screen generating system, comprising:

a dot center determining unit to grow arbitrarily generated dot centers into uniform binary patterns;

a filter forming unit to calculate a main distance of dot centers from adjacent dot centers and to form a screen filter based on the main distance; and a screen generating unit to generate a halftone screen based on the screen filter, wherein the filter forming unit forms a frequency filter based on the main distance in a frequency domain and forms the screen filter in a spatial domain by inverting the frequency filter.

* * * * *

UNITED STATES PATENT AND TRADEMARK OFFICE
CERTIFICATE OF CORRECTION

PATENT NO. : 7,619,777 B2  Page 1 of 1
APPLICATION NO. : 11/390252
DATED : November 17, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 794 days.

Signed and Sealed this

Twenty-sixth Day of October, 2010

David J. Kappos
*Director of the United States Patent and Trademark Office*